Patented Apr. 14, 1936

2,037,257

UNITED STATES PATENT OFFICE 2,037,257

PROCESS OF MAKING NONSTRUCTURAL ACTIVATED CARBON

Jacque C. Morrell, Oak Park, Ill.

No Drawing. Application January 8, 1934, Serial No. 705,737

6 Claims. (Cl. 252—3)

The present invention is a continuation in part of my application Serial No. 672,231, filed May 22, 1933.

It is the main object of this invention to produce non-structural adsorptive or activated carbons. In activated carbons of this type it is not important that the supporting walls of the individual particles be dense or firm or that the particle or grain itself possess the structural strength required of the granular type of carbons. An example of the latter is boneblack, such as is employed in filter columns in the refining of sugar, or the activated charcoals such as cocoanut char used for gas adsorption, in gas masks, etc. The structural strength of these and other types of chars is of highest importance since the life of the material depends upon its maintaining its original size and granular form. The adsorptive qualities of such chars depend to a large extent upon the number and character of the pores therein. It is to be understood in connection with the present invention that the materials undergoing treatment may be in a relatively soft granular condition in intermediate stages of the process, and this is desirable as it facilitates operation and treatment. However, the final product is employed and is generally useful only in a finely divided form (for example, 100 mesh or above) and the external surface effect as well as the quality of the product enters into its efficiency as a refining, purifying and decolorizing agent. The product of the present process is employed in a finely divided condition mainly by what is known as the contact method wherein the material in finely divided or powdered form is contacted with the liquid to be treated and subsequently removed by filtration rather than by being placed in situ, such as in a filter column and passing or filtering the liquid through it. The term "non-structural" as used in the claims further means a material which is employed in a relatively finely divided or powdered condition and which does not depend necessarily for its usefulness or utility on its ability to withstand or resist shattering, abrasion and crushing and to be retained in a granular or particle form of relatively large size.

The product of the process may be employed in various industrial processes as a decolorizing and purifying agent for the removal of color and impurities from liquids and solutions, and, in general, it may be applied wherever adsorptive decolorizing or purifying material of non-structural character is required. Among its specific uses are the refining and decolorizing of animal and vegetable oils; as a catalyst; for decolorizing, purifying and refining sugar solutions, syrups such as those from cane, corn, maple, sorghum, glycerine, and aqueous and non-aqueuos solutions of organic and inorganic compounds; purification of water and as a deodorant. Other uses are: purification of gelatins, phenols, drugs, pharmaceuticals, and the bleaching and purification of various crude and partly refined off-grade and off-flavored food and vegetable oils, including cottonseed, linseed, rapeseed, coconut, soya bean, and animal oils and fats, such as lard, fish oils, medicinal oils, etc. Some special fields of application are: industrial water, garage wastes, paint oils, varnishes and resins, medicinals generally, recovery of waste photographic solutions, recovery of precious metals, and the like.

In one aspect the present invention comprises subjecting wood charcoal, preferably from hardwood, and in granular or comminuted condition of from substantially 8 to 100 mesh, to a temperature adequate to substantially completely carbonize the same (e. g., above 1000° F.) and then to an activation treatment, preferably by treatment with steam at highly elevated temperatures (e. g., above 1500° F.) and for a period of time of from approximately 20 minutes to 4 hours, alone or in combination with other oxidizing agents, such as air, flue gas and the like. The carbonization and steam activation steps may be combined in one operation. The product may be subsequently treated with a solvent, such as a dilute acid, for example, hydrochloric acid, to remove ash or inert substances therefrom. The final product of the present invention is of non-structural form and is generally employed as a powder or in finely divided form.

The so-called pores in wood char are to a great extent of the honeycomb or bread-like type, that is, completely closed or separated from each other by thin walls rather than of the lung-like structure comprising continuous pores. Wood char is thus not adapted to adsorptive purposes by virtue of its internal structure. It has also been found unsuitable after treatment in connection with the present invention as a structural char, i. e., to be employed in granular form because of its low mechanical strength. Furthermore, the presence of hydrocarbons and carbon-hydrogen compounds generally, either adsorbed on the char or intimately mixed with the carbon, renders it inactive before treatment for adsorptive or decolorizing purposes even when finely divided. Whether the inactivity of ordinary wood charcoal is caused by secondary inactive coke deposited thereon or is a stabilized complex of hydrocarbons adsorbed on a base of active carbon, or is an actual compound containing a high percentage of carbon and a relatively low percentage of hydrogen and other elements, is not definitely known. Relative to this, and in connection with the present invention, I have found that ordinary commercial hardwood charcoal has practically no adsorptive power and is almost entirely inactive as a decolorizing agent when tested with raw cane sugar solutions or corn sugar liquors. I have also found that even when heated to a temperature of 1000° F. to 1500° F. to more completely carbonize the original char it possesses practically no activity as a decolorizing agent. Authorities in the art believe that such high temperature treatment involving the deposition of highly inactive secondary carbon renders such a carbon very difficult, if not impossible, to activate. However, I have found in connection with the present invention that I may convert such wood char into a highly active non-structural carbon.

The raw material employed in the present invention is wood charcoal, and more particularly and preferably hardwood charcoal. Some examples given by an authority of the scale of relative hardness of wood are shown in the following table:

*Scale of hardness of wood*

| | | | |
|---|---|---|---|
| Shellbark hickory | 100 | Yellow oak | 60 |
| Pignut hickory | 96 | Hard maple | 56 |
| White oak | 84 | White elm | 58 |
| White ash | 77 | Red cedar | 56 |
| Dogwood | 75 | Wild cherry | 55 |
| Scrub oak | 73 | Yellow pine | 54 |
| White hazel | 72 | Chestnut | 52 |
| Apple tree | 70 | Yellow poplar | 51 |
| Red oak | 69 | Butternut | 43 |
| White beech | 65 | White birch | 43 |
| Black walnut | 65 | White pine | 30 |
| Black birch | 62 | | |

Ordinarily, woods having hardness above 56 in the foregoing table are preferred, although the other types may be employed to produce a somewhat less desirable product. Another scale of hardness or classification given by another authority is shown below:

Very hard: Hawthorn.
Hard: Maple, hornbeam, wild cherry.
Moderately hard: Oak, plum, robinia, elm.
Rather hard: Beech, walnut, pear, apple, chestnut.
Soft: Spruce, silver fir, pine, larch, alder, birch, horse chestnut, ash.
Very soft: Lime, poplar, willow.

In some classifications the terms "hardwood" and "softwood" as generally used refer to broad-leaved woods and coniferous woods, respectively.

Ordinarily, wood is destructively distilled in large rectangular retorts to produce charcoal and volatile products comprising a condensate and non-condensable gas. The condensate may be separated into tar and pyroligneous acids, the latter containing soluble tar, acetic acid, methyl alcohol, aldehydes and other products.

The yield of charcoal will vary with the kind and quality of the wood and the conditions of treatment, for example, temperature and time. As examples, yields of approximately 40 bushels per cord and approximately 35% by weight on a practically moisture-free basis may be obtained.

To further illustrate the variation in yield and the composition of the charcoal produced at different maximum temperatures the data of Hawley (Wood Distillation, A. C. S. Monograph, 1923, Table 15) is shown below:

*Amount and composition of charcoal produced at different maximum temperatures*

COMPOSITION OF CHARCOAL

| Distillation temperature | Carbon | Hydrogen | Oxygen, etc. | Yield of charcoal in percentage weight of drywood |
|---|---|---|---|---|
| °C. | Percent | Percent | Percent | Percent |
| 200 | 52.3 | 6.3 | 41.4 | 91.8 |
| 300 | 73.2 | 4.9 | 21.9 | 51.4 |
| 400 | 77.7 | 4.5 | 18.1 | 40.6 |
| 500 | 89.2 | 3.1 | 6.7 | 31.0 |
| 700 | 92.8 | 2.4 | 4.8 | 27.8 |
| 900 | 96.1 | .7 | 3.2 | 26.6 |
| 1000 | 96.6 | .5 | 2.9 | 26.8 |
| 1100 | 96.4 | .4 | 3.2 | 26.1 |

The ash in the charcoal may vary from 0.1% to approximately 2%, increasing as the carbon therein increases. An average content of approximately 1% may be present.

In connection with the composition of wood charcoal, Hawley states that it may be considered as consisting of still higher members of the series found in the tar or in the pitch, deposited in the primary charcoal.

The yield of charcoal at 400° C., a temperature used in general practice, is approximately 40% and this charcoal contains approximately 78% carbon. From the above it may be readily understood that wood charcoal as produced usually contains a considerable percentage of volatile matter which may vary in practice and the removal of which is one of the factors in the production of an activated product therefrom. It is, of course, to be understood that the wood may be carbonized directly to proper degree of volatile matter removal and subsequently activated, and the invention comprises this feature.

The present invention is directed to a highly economic method of directly converting wood charcoal into activated carbon and as such represents a distinct advance in the art.

In carrying out the process of the invention the wood char, preferably hardwood char, may be first crushed or ground, or otherwise comminuted, to approximately 8 to 100 mesh. It is preferred that the product undergoing treatment be in a granular condition and that it should not contain too large a percentage of particles larger than 8 mesh because of the difficulty in penetrating and activating the larger particles, and likewise that it should not contain too large a percentage of fines above 100 mesh because of the mechanical difficulty in handling the smaller particles and the large losses resulting therefrom. The preferred range of size is 8 to 30 mesh. The granular material may be subjected to carbonizing conditions in excess of 1000° F. to more completely devolatilize it, and it is then subjected to steam treatment, preferably at temperatures of from 1500° F. to 1700° F. for a period preferably of approximately twenty minutes to four hours, and even longer in some cases, or the charcoal in granular condition may be subjected directly to steam treatment under the above conditions. A rotary retort may be used in this operation. Generally, treatment in thin layers is preferred in the activating step. When carbonized prior to the steam treatment the charcoal is treated for a period of approximately ½ to 2 hours, preferably at 1200° F. to 1500° F. It is quite necessary that the material undergo activation by the high temperature oxidation treatment with steam for a period exceeding the one time limit, namely, approximately 20 minutes. The higher temperatures should preferably be employed with the shorter time factors and the lower temperatures in the range shown with the longer time factors. Too short a time of treatment results in an unsatisfactory and inferior product; too long a time in too great waste.

After the steam treatment the product is then treated with a dilute acid either before or after reducing to the desired mesh for use, for example, below 200 mesh and above 100 mesh. Hydrochloric acid is preferred for this purpose in concentrations of approximately 1% to 2%, although higher concentrations may be employed. The amount and concentration of hydrochloric acid is preferably controlled to give the product a definite pH, and this in turn may be controlled by the pH of the wash-water leaving the char during subsequent washing of the same with water following the acid treatment. Preferably the product is treated at elevated temperatures with the acid, for example, 150° F. to 200° F. The function of the acid treatment is two-fold, namely, to remove ash and other undesirable impurities, and, secondly, to impart a definite hydrogen ion concentration to the char. This is important in connection with the activity of the product. Following the acid treatment the char is water-washed and then dried. For certain purposes the char may be required to be neutral, in which case it may be neutralized with an alkali, preferably sodium carbonate, and then water washed to remove salts.

Wood waste, for example, hardwood sawdust, chips and the like, may also be treated in accordance with the present invention as described above, preferably carbonizing prior to steam activating but, depending upon the results desired, the two operations may be combined by steam-treating direct after bringing the wood to temperature. Treatment with an acid or similar solvent is also employed in this case.

As a specific example of the results obtained according to the present invention a hardwood char containing approximately 15% of volatile matter, made in the present instance from hickory and oak in a commercial retort, was reduced to 15 to 40 mesh and then subjected to carbonization at approximately 1400° F. for approximately one hour. Super-heated steam was introduced into the retort and the temperature elevated to approximately 1650° F. and maintained for a period of time of approximately 3½ hours. The product was then reduced in size to from 100 to 200 mesh and treated with a 2% solution of hydrochloric acid at a temperature of approximately 175° F., after which it was thoroughly water-washed, the pH of the resulting product in the present instance being approximately 5. When tested with raw corn sugar solutions approximately 90% of the color in the particular solution undergoing treatment was removed.

In another instance the product was brought up to a temperature of approximately 1675° F. and then directly subjected to treatment with super-heated steam for a period of approximately 4 hours, subsequently treated with dilute acid, water-washed and dried. The resulting product showed a decolorizing value with raw sugar solutions of approximately 88%.

Both products were superior to various high grade carbons tested for comparison not alone on sugar solutions but on various other materials such as water, chemicals, vegetable oils, etc.

The above examples are given for illustrative purposes only and it may be readily recognized that the conditions of treatment may vary somewhat depending upon the material undergoing treatment and the results desired. Hence, the specific examples are not to be considered as limitations upon the broad scope and spirit of the invention.

I claim as my invention:

1. A process for the production of non-structural activated carbon which comprises subjecting comminuted wood charcoal to heat treatment to remove volatile matter therefrom, subjecting the resulting product to the action of an oxidizing gas at elevated temperature, higher than 1500° F. and for a period of time longer than twenty minutes and less than four hours, and treating the resulting product with an acid solvent to remove undesirable impurities.

2. A process for the production of non-structural activated carbon which comprises heating hardwood charcoal in comminuted condition at a temperature above 1000° F. to remove volatile matter therefrom, subjecting the resulting product to the action of steam at a temperature above 1500° F. and for a period of time longer than twenty minutes and less than four hours adequate to activate the same, and treating the resulting product with an acid solvent.

3. A process for the production of non-structural activated carbon which comprises heating hardwood charcoal in comminuted condition, the major portion of which is between 8 to 100 mesh, at a temperature adequate to remove volatile matter therefrom, subjecting the resulting product to the action of steam at a temperature higher than 1500° F. for a period of time longer than twenty minutes and less than four hours adequate to activate the same, and treating the resulting product with dilute acid to remove undesirable impurities.

4. A process for the treatment of wood charcoal to produce activated carbon therefrom which comprises subjecting the same while in comminuted condition to the action of steam at a temperature higher than 1500° F. and lower than 1700° F. and for a period of time longer than twenty minutes and less than four hours adequate to activate the same, and treating the resulting product with a dilute acid.

5. A process for the production of non-structural activated carbon which comprises subjecting comminuted wood charcoal to heat treatment to remove volatile matter therefrom, subjecting the resulting product to the action of steam at elevated temperature higher than 1500° F. and lower than 1700° F. for a period of time longer than twenty minutes and less than four hours, and treating the resulting product with an acid solvent to remove undesirable impurities.

6. A process for the production of non-structural activated carbon which comprises subjecting wood in comminuted condition to heat treatment at a temperature adequate to carbonize the same, subjecting the resulting product to the action of steam at a temperature above 1500° F. and lower than 1700° F. for a period of time longer than twenty minutes and less than four hours, and subjecting the resulting product to the action of dilute acid.

JACQUE C. MORRELL.